(12) United States Patent
Kadono

(10) Patent No.: US 8,385,409 B2
(45) Date of Patent: Feb. 26, 2013

(54) PICTURE CODING METHOD, PICTURE DECODING METHOD, PICTURE CODING APPARATUS, PICTURE DECODING APPARATUS, AND PROGRAM THEREOF

(75) Inventor: Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/330,890

(22) Filed: Dec. 20, 2011

(65) Prior Publication Data

US 2012/0099644 A1    Apr. 26, 2012

Related U.S. Application Data

(62) Division of application No. 13/031,794, filed on Feb. 22, 2011, now Pat. No. 8,111,747, which is a division of application No. 11/204,318, filed on Aug. 16, 2005, now Pat. No. 7,916,782.

(30) Foreign Application Priority Data

Aug. 18, 2004    (JP) .................................. 2004-238431

(51) Int. Cl.
H04N 7/12    (2006.01)
(52) U.S. Cl. ............................... 375/240.01; 375/240.02
(58) Field of Classification Search .................. 375/240, 375/240.01, 240.02, 240.12
See application file for complete search history.

(56) References Cited

U.S. PATENT DOCUMENTS

| | | | |
|---|---|---|---|
| 5,517,246 A | 5/1996 | Suzuki | |
| 5,745,186 A | 4/1998 | Shimizu et al. | |
| 6,556,627 B2 | 4/2003 | Kitamura et al. | |
| 6,608,935 B2 | 8/2003 | Nagumo et al. | |
| 2002/0003840 A1 | 1/2002 | Ueda et al. | |
| 2003/0184713 A1 | 10/2003 | Honda | |
| 2004/0085447 A1 | 5/2004 | Katta et al. | |
| 2006/0088108 A1 | 4/2006 | Ueda et al. | |
| 2006/0088109 A1 | 4/2006 | Ueda et al. | |

FOREIGN PATENT DOCUMENTS

| | | |
|---|---|---|
| JP | 07-322244 | 12/1995 |
| JP | 08-317309 | 11/1996 |
| JP | 11-205786 | 7/1999 |
| JP | 2000-083193 | 3/2000 |
| JP | 2001-268592 | 9/2001 |
| JP | 2002-027462 | 1/2002 |
| JP | 2002-325254 | 11/2002 |

OTHER PUBLICATIONS

International Standard, ISO/IEC 14496-10, Second Edition; Oct. 1, 2004, Information Technology—Coding of Audio-Visual Objects—Part 10: Advanced Video Coding, ISO/IEC 14496-10:2004(E), p. 31, p. 56 and p. 57.

*Primary Examiner* — Allen Wong
(74) *Attorney, Agent, or Firm* — Wenderoth, Lind & Ponack, L.L.P.

(57) ABSTRACT

A picture coding method of the present invention codes a picture signal and a ratio of a number of luminance pixels and a number of chrominance pixels for the picture signal, and then one coding method out of at least two coding methods is selected depending on the ratio. Next, data related to a picture size is coded in accordance with the selected coding method. The data related to the picture size indicates a size of the picture corresponding to the picture signal or an output area, which is a pixel area to be outputted in decoding in a whole pixel area coded in the picture signal coding.

3 Claims, 15 Drawing Sheets

FIG. 4B

| Value | Code | Code length |
|---|---|---|
| 0 | 1 | 1 |
| 1 | 010 | 3 |
| 2 | 011 | 3 |
| 3 | 00100 | 5 |
| 4 | 00101 | 5 |
| 5 | 00110 | 5 |
| 6 | 00111 | 5 |
| 7 | 0001000 | 7 |
| 8 | 0001001 | 7 |
| 9 | 0001010 | 7 |
| 10 | 0001011 | 7 |
| 11 | 0001100 | 7 |
| 12 | 0001101 | 7 |

FIG. 4A

| Chroma Format | Code |
|---|---|
| Luminance only | 1 |
| 4:2:0 | 010 |
| 4:2:2 | 011 |
| 4:4:4 | 00100 |

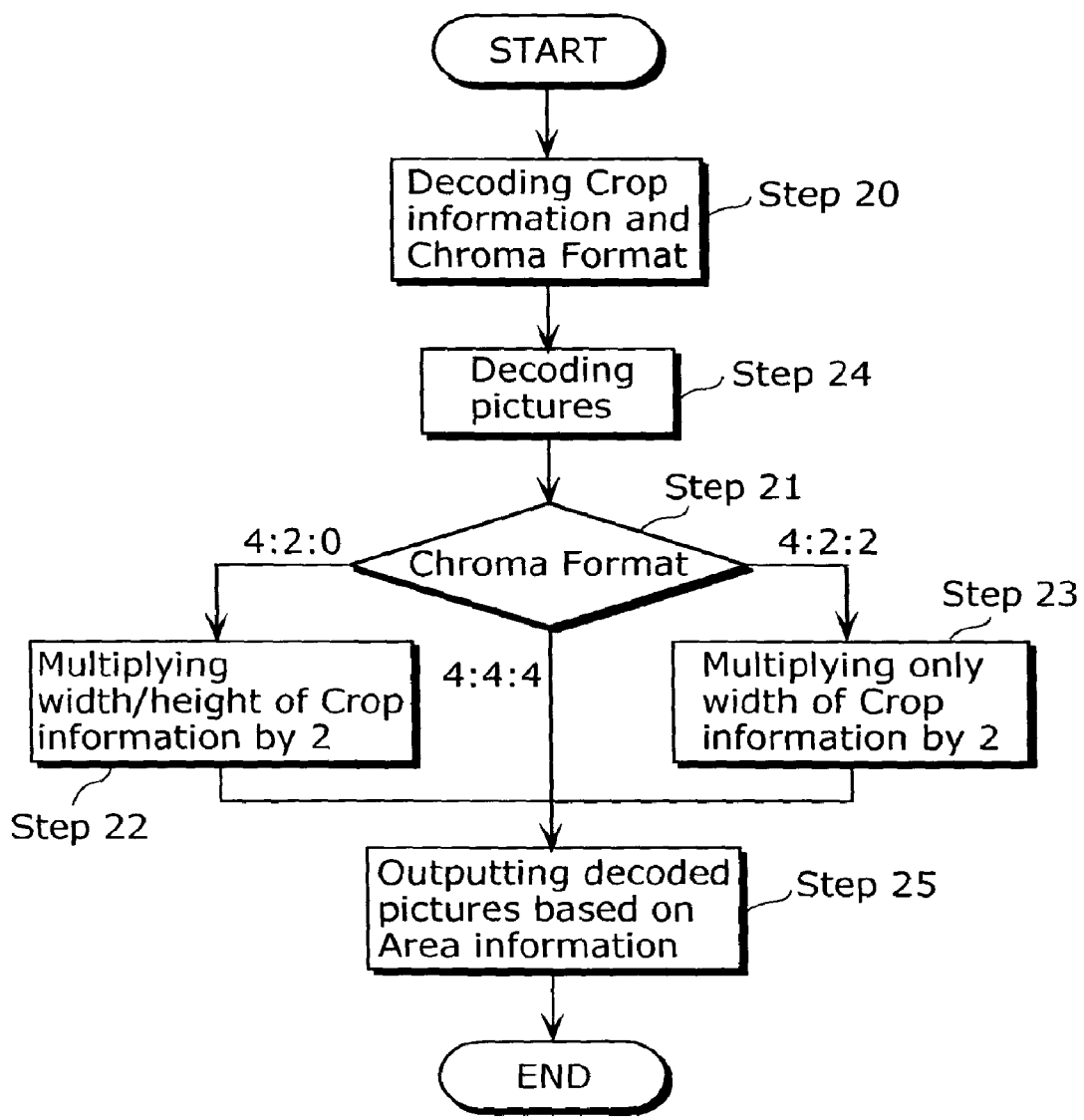

PICTURE CODING METHOD, PICTURE DECODING METHOD, PICTURE CODING APPARATUS, PICTURE DECODING APPARATUS, AND PROGRAM THEREOF

This application is a divisional of U.S. application Ser. No. 13/031,794, filed Feb. 22, 2011, now U.S. Pat. No. 8,111,747 which is a divisional application of Ser. No. 11/204,318, filed Aug. 16, 2005 now U.S. Pat. No. 7,916,782.

BACKGROUND OF THE INVENTION (1) Field of the Invention

The present invention relates to a picture coding method for efficiently compressing moving pictures and to a picture decoding method for correctly decoding the compressed moving pictures.

(2) Description of the Related Art

In the age of multimedia which integrally handles audio, video and other pixel values, existing information media (e.g., newspaper, magazine, television, radio, telephone and other means) through which information is conveyed to people, has recently been included in the scope of multimedia. Generally, multimedia refers to something that is represented by associating not only characters, but also graphics, audio and especially pictures and the like together. However, in order to include the aforementioned existing information media into the scope of multimedia, it is necessary to represent such information in digital form.

However, when calculating the amount of information contained in each of the aforementioned information media as the amount of digital information, the amount of information per character is 1 to 2 bytes in the case of characters, while the amount of information to be required is 64 Kbits per second in the case of audio (telephone quality), and 100 Mbits per second in the case of moving pictures (current television reception quality). Therefore, it is not realistic for the aforementioned information media to handle such an enormous amount of information as it is in digital form. For example, although video phones are already in practical use by using Integrated Services Digital Network (ISDN) which offers a transmission speed of 64 Kbits/s to 1.5 Mbits/s, it is not possible to transmit video of televisions and cameras directly through ISDN.

In this circumstance, information compression techniques have become required, and moving picture compression techniques compliant with H.261 and H.263 standards recommended by ITU-T (International Telecommunication Union-Telecommunication Standardization Sector) are employed for video phones, for example. Moreover, according to information compression techniques compliant with the MPEG-1 standard, it is possible to store picture information into an ordinary music CD (compact disc) together with audio information.

Here, MPEG (Moving Picture Experts Group) is an international standard on compression of moving picture signals standardized by ISO/IEC (International Organization for Standardization, International Electrotechnical Commission), and MPEG-1 is a standard for compressing television signal information approximately into one hundredth so that moving picture signals can be transmitted at a rate of 1.5 Mbit/s. Furthermore, since the intended quality is a middle-quality realized by a transmission speed of chiefly about 1.5 Mbit/s in MPEG-1 standard, MPEG-2, which has been standardized with a view to satisfying requirements for further improved picture quality, allows data transmission equivalent in quality to television broadcasting through which moving picture signals are transmitted at a rate of 2 to 15 Mbit/s. Moreover, MPEG-4 has been standardized by a working group (ISO/IEC JTC1/SC29/WG11) which promoted the standardization of MPEG-1 and MPEG-2. MPEG-4, which provides a higher compression ratio than that of MPEG-1 and MPEG-2 and which enables an object-based coding/decoding/operation, is capable of providing a new functionality required in this age of multimedia. At the beginning stage of standardization, MPEG-4 was aimed at providing a low bit rate coding method, but it has been extended as a standard supporting more general coding that handles interlaced images as well as high bit rate coding. Currently, an effort has been made jointly by ISO/IEC and ITU-T for standardizing MPEG-4 AVC and ITU-T H.264 as picture coding methods of the next generation that offer a higher compression ratio. And these are approved as international standards as of June 2004.

As for picture coding, coding is generally performed per block, and mostly the size of the block is 16 pixels per unit. Actually the picture size allowing coding is in multiples of 16, which is a multiple of the number of pixels of per block. However, for example, the number of pixels for picture signals of HDTV is 1920 in a horizontal and 1080 in vertical. However, 1080 is not a multiple of 16 inconveniently. Because of this, coding is performed per block, which results in clipping out of the coded (decoded) picture for outputting (display on a screen).

FIG. 1 is a drawing to describe a display area of pictures. In FIG. 1, the number of horizontal pixels is represented by MBWidth and the number of vertical pixels is represented by MBHeight for coding (encoding) pictures. And also a black circle denotes a pixel outputted by decoding apparatus and white circle denotes a pixel to be coded but not outputted by decoding apparatus. In order to indicate pixels to be outputted among the coded pixels, the number of horizontal pixels, which is the Width of the area to be outputted, and the number of vertical pixels, which is the Height of the area to be outputted are represented by the number of left pixels LCrop, right pixels RCrop, top pixels TCrop and bottom pixels BCrop. Here following equalities can be obtained:

Width=MBWidth−Lcrop−Rcrop

Height=MBHeight−TCrop−Bcrop.

Picture signals are usually represented by a luminance and a chrominance. A human's ability for discriminating resolution of chrominance is relatively weak comparing to discriminating of luminance. Therefore, compressing efficiency is improved by making the number of luminance smaller than the number of chrominance. Generally the ratio of the number of luminance to the number of chrominance is relatively small for general consumer products while the ratio is close to one for professional products.

FIG. 2A, FIG. 2B and FIG. 2C are drawings to show color format of pictures. In the drawings a white circle denotes a pixel location of luminance and a black circle denotes a pixel location of chrominance. FIG. 2A is 4:2:2 color format, FIG. 2B is 4:2:2 color format and FIG. 2C is 4:4:4 color format.

It should be noted that in the case of a component picture signal represented by RGB, wherein as green includes a large amount of luminance components, a white circle denotes G (green) and a black circle denotes R (red) and B (blue).

FIG. 3 is a drawing to show a data structure of bitstream. The bitstream Str is comprised of PixelData which is each pixel value datum, and CommonData which is a common data of frame or plural of frames. The CommonData includes a color format ChromaFormat and an output area coding information CropData. The color format ChromaFormat indicates, for example, any one of 4:2:0, 4:2:2 or 4:4:4. The output area coding information CropData indicates, for example, the number of left pixels LCrop, right pixel RCrop, top pixels TCrop and bottom pixels BCrop.

FIG. 4A and FIG. 4B are drawings to show a variable-length code table. FIG. 4A is an example of a table of variable-length code table of color format ChromaFormat. FIG. 4B shows an output area coding information CropData. It is an example of a variable-length code table for coding the each value (Value) of the number of left pixels LCrop, right pixels RCrop, top pixels TCrop and bottom pixels BCrop. When the value (Value) is larger, the code length is longer, and more number of bits is necessary.
(see ITU-T Rec.H264|ISO/IEC 14496-10 version 1 "Information technology—Coding of audio-visual objects—Part 10: Advanced video coding", non-patent literature 1)

Now, the number of chrominance pixels is less than the number of luminance pixels. Thus, the number of luminance pixels which can be outputted is actually an integral multiple. For example in FIG. 2A, two pixels in horizontal direction and two pixels in vertical direction of luminance corresponds to one pixel of chrominance, and the number of luminance pixels and the location of pixels that can be outputted are multiples of two in both horizontal and vertical directions. Because of this, each value (Value) of the number of left pixels LCrop, right pixels RCrop, top pixels TCrop and bottom pixels BCrop becomes an even number. On the other hand, in the case of FIG. 2C, either an even number or an odd number can be possible. However, in the case that the even number is the only possible case, if the values are coded by the way in FIG. 4B substantially, the coding efficiency can not be expected, since the odd numbers, not to be coded, are also included in the case of FIG. 2A.

If a coding supposing only the color format ChromaFormat like FIG. 2A (for example the non-patentable literature 1), the number of left pixels LCrop, right pixels RCrop, top pixels TCrop and bottom pixels BCrop are multiplied by ½ respectively, and then the value is coded using the table in FIG. 4B. By this way, for example RCrop=4 needs originally 5 bits of "00101", but now coding can be possible with 3 bits of "011" from RCrop/2=2, as a result, 2 bits can be saved. However, only even position can be displayed with this way in the case like FIG. 2C.

BRIEF SUMMARY OF THE INVENTION

The object of the present invention is to provide a picture coding method, a picture decoding method, a picture coding apparatus, a picture decoding apparatus, and a program thereof for coding data related to a picture size with less number of bits without deteriorating accuracy of output pixel to be presented.

In order to achieve the object, the picture coding method is for coding a picture signal, coding a ratio of the number of luminance pixels to the number of chrominance pixels for the picture signal, selecting one coding method out of at least two coding methods depending on the ratio and coding a data related to a picture size in accordance with the selected coding method.

According to this construction, the data related to picture size is coded by the selected coding method depending on the ratio of the number of luminance pixels to chrominance pixels, the coding, therefore, can be executed with less number of bits without deteriorating the accuracy of output pixel to be presented.

Here, the data related to the picture size may indicate the size of a picture corresponding to the picture signal.

According to this construction, coding can be executed with less number of bits without deteriorating the accuracy of output pixel being able to be presented for the picture size corresponding to the picture signal.

In the selecting of the coding method, in a case where a ratio of the number of horizontal luminance pixels to the number of horizontal chrominance pixels is M:1, a coding method coding 1/M of the number of horizontal pixels may be selected, the horizontal luminance pixels and the horizontal chrominance pixels being included in the picture signal.

According to this construction, a variable length code table corresponding to 1/M variable length coding instead of a variable length code table corresponding to variable length coding of M can be used. Thereby coding 1/M of the number of horizontal pixels to a variable length code with less number of bits can be executed. For example, in the case where variable length coding is executed for the number of horizontal pixels, the coding is executed using the part of 1/M of the variable length code table with short code length in the head in the variable length code table indicating M of variable length code, thus the coded variable length code of the number of horizontal pixels can be shortened.

In the selecting of the coding method, in a case where a ratio of the number of vertical luminance pixels to the number of vertical chrominance pixels is N:1, a coding method coding 1/N of the number of vertical pixels may be selected, the vertical luminance pixels and the vertical chrominance pixels being included in the picture signal.

According to this construction, a variable length code table corresponding to 1/N variable length coding instead of a variable length code table corresponding to variable length coding of N can be used. Thereby coding the value of 1/N of the number of vertical pixels to a variable length code with less number of bits can be executed. For example, in the case where variable length coding is executed for the number of vertical pixels, the coding can be executed using the part of 1/N of the variable length code table with short code length in the head in the variable length code table indicating N of variable length code.

Here, the data related to the picture size may indicate an output area in a whole pixel area coded in the coding of a picture signal, the output area being a pixel area to be outputted in decoding.

According to this construction, in the case where the size of the coded whole pixel area is larger than the output area which is a pixel area to be outputted in decoding, coding can be executed with less number of bits without deteriorating the accuracy of output area.

Here, the data related to the picture size includes a bottom crop value and a right crop value, the bottom crop value may show the number of pixels from the bottom end of the whole pixel area to the bottom end of the output area, the right crop value may show the number of pixels from the right end of the whole pixel area to the right end of the output area.

The data related to the picture size further includes a top crop value and a left crop value, the top crop value may show the number of pixels from the top end of the whole pixel area to the top end of the output area, the left crop value may show the number of pixels from the left end of the whole pixel area to the left end of the output area.

According to this construction, it is possible to improve coding efficiency further because the coding is executed for the crop value of top, bottom, left and right, having values that are smaller than the number of horizontal and vertical pixels of output area by the selected coding method.

Here, in the selecting of the coding method, in a case where a ratio of the number of horizontal luminance pixels to the number of horizontal chrominance pixels is M:1, a coding method coding 1/M of each value of the left crop value and the right crop value may be selected, the horizontal luminance pixels and the horizontal chrominance pixels being included in the picture signal.

According to this construction, a variable length code table corresponding to 1/M variable length coding instead of a variable length code table corresponding to variable length coding of M can be used. Thereby each value of 1/M of left/right crop values can be coded to variable length code with less number of bits. For example, in the case where variable length coding is executed for each value of 1/M of left/right crop values, the coding is executed using the part of 1/M of the variable length code table with short code length in the head in the variable length code table indicating M of variable length code, thus the coded variable length code of the number of horizontal pixels can be shortened.

Here, in the selecting of the coding method in a case where a ratio of the number of vertical luminance pixels to the number of vertical chrominance pixels is N:1, a coding method coding 1/N of each value of the top crop value and the bottom crop value may be selected, the vertical luminance pixels and the vertical chrominance pixels being included in the picture signal.

According to this construction, a variable length code table corresponding to 1/N variable length code instead of a variable length code table corresponding to variable length code of N can be used. Thereby coding the each value of 1/N of the top and the bottom crop values to a variable length code with less number of bits can be executed. For example, in the case where variable length coding is executed for the each value of 1/N of top and bottom crop values, the coding is executed using the part of 1/N of the variable length code table with short code length in the head in the variable length code table indicating N of variable length code, thus the coded variable length code of the number of vertical pixels can be shortened.

Further, the picture decoding method, the picture coding apparatus, the picture decoding apparatus and the program thereof have the same constructions as mentioned above.

The disclosure of Japanese Patent Application No. 2004-238431 filed on Aug. 18, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings identified below that illustrate a specific embodiment of the invention.

FIG. 4A and FIG. 4B are drawings to show a variable-length code table.

FIG. 8A and FIG. 8B are flowcharts to show picture decoding methods of the present invention.

FIG. 9A shows an example of a physical format of flexible disc as a recording medium.

FIG. 9B shows a front view of an appearance, a section structure for a flexible disc and a flexible disc.

FIG. 9C shows a structure for recording and replaying of above said program on a flexible disc.

DETAILED DESCRIPTION OF THE INVENTION

Hereinafter the embodiment of the present invention is described using FIG. 5 to FIG. 13.

Figure 5:
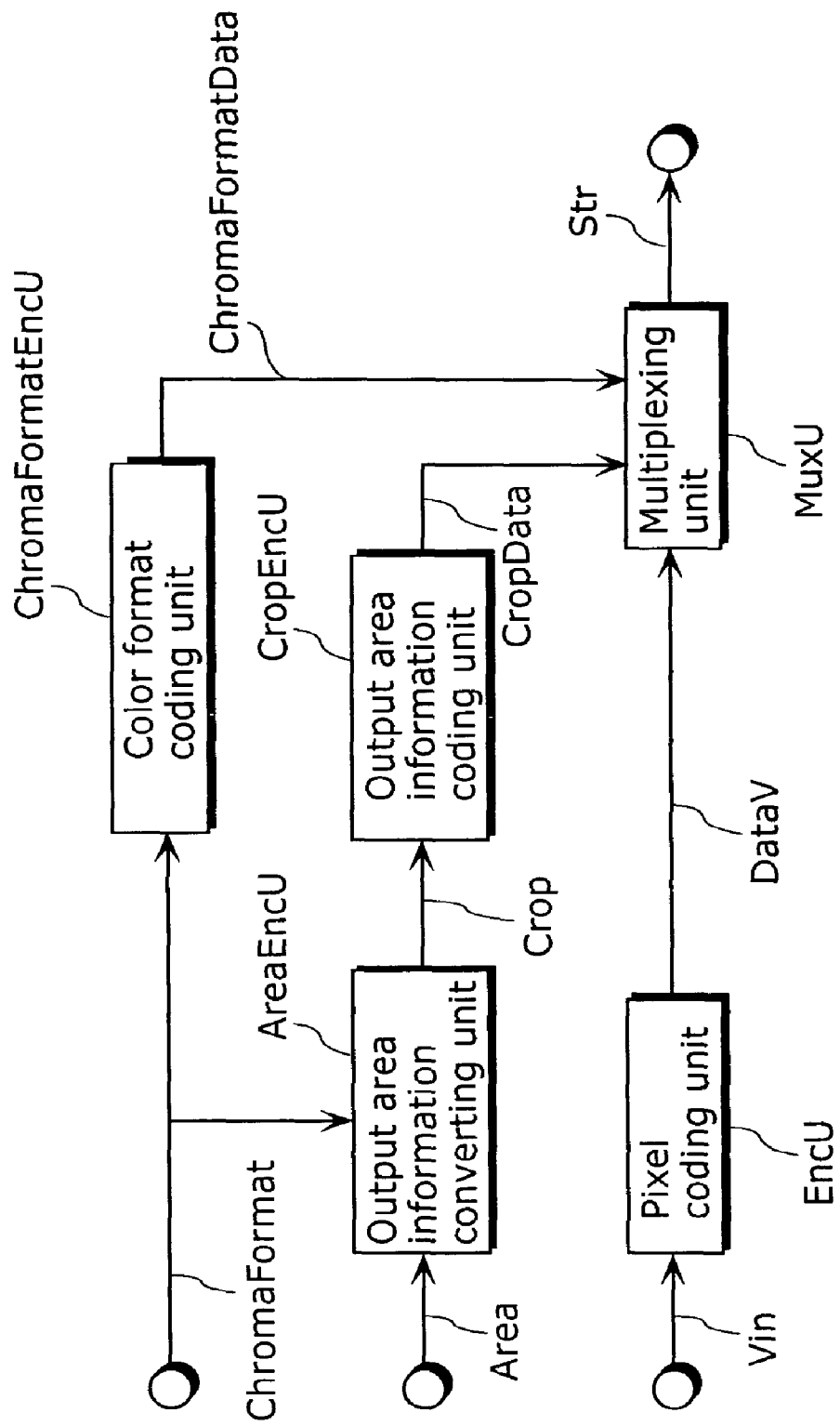
FIG. 5 is a block diagram to show a structure of a picture coding apparatus of the present invention.

FIG. 5 is a block diagram to show a structure of a picture coding apparatus of the present invention. The pixels values of input picture Vin are coded using orthogonal transformation, quantization, variable length coding, motion compensation and so on by pixel coding unit EncU. The coded input picture Vin is outputted as coded picture data DataV. The output area Area specifying the area of pixels to be outputted by a picture decoding apparatus is inputted from outside into an output area information converting unit AreaEncU, and the output area information converting unit AreaEncU coverts output area Area into output area information Crop depending on color format ChromaFormat inputted from outside.

For example, in the case where the color format ChromaFormat indicates that the ratio of pixel numbers of luminance to chrominance is M:1 in horizontal direction and N:1 in vertical direction, LCrop, RCrop, TCrop and BCrop representing output area Area are converted into LCrop/M, RCrop/M, TCrop/N and BCrop/N respectively. These represent the output area information Crop. The output area information coding unit CropEncU codes the output area information Crop by such as the variable length code table in FIG. 4B. And then the coded output area information Crop is outputted as the output area coding information CropData. On the other hand, the color format coding unit ChromaFormatEncU codes the color format ChromaFormat by such as the variable length code table in FIG. 4A. And then the coded color format ChromaFormat is outputted as the color format coding information ChromaFormatData. A multiplexing unit MuxU multiplexes the color format coding information ChromaFormatData, the output area coding information CropData and the coding picture data, and outputs the multiplexed data as a bitstream Str.

Conventionally the output area coding information CropData has been coded by a fixed method irrespective of color format ChromaFormat. In the present invention the output area coding information CropData is coded based on color format ChromaFormat. In this coding method, in the case where, the ratio of the number of horizontal pixels of luminance to chrominance is M:1, the value of the output area coding information CropData is multiplied by 1/M, and the 1/M of output area coding information CropData is coded. This method saves a necessary number of bits for coding, since the size of the output area coding information CropData is decreased. In the case where the ratio of the number of horizontal pixels of luminance to chrominance is M:1, the number of luminance pixels is multiple of M. According to the coding of embodiment, the output area can be presented accurately with M pixel unit that is the minimum unit of the number of luminance pixels.

Similarly, in the case where, the ratio of the number of vertical pixels of luminance to chrominance is N:1, the value of the output area coding information CropData is multiplied by 1/N, and the 1/N of output area coding information CropData is coded. This method saves a necessary number of bits for coding, since the size of the output area coding information CropData is decreased. In the case where the ratio of the number of vertical pixels of luminance to chrominance is N:1, the number of luminance pixels is multiple of N. According to the coding of embodiment, the output area can be presented accurately with N pixel unit that is the minimum unit of the number of luminance pixels.

As mentioned hereinbefore, it is possible to code the output area coding information CropData with less number of bits without deteriorating accuracy of output pixel to be represented, and the practical value is high.

It should be noted that the output area information Crop, indicated by LCrop, RCrop, TCrop and BCrop, and Width and Height, may be used as a part of data substitutively. Additionally, in the case where LCrop and Tcrop of the output area are zero, only RCrop and BCrop may be coded as output information Crop Data.

Figure 1:
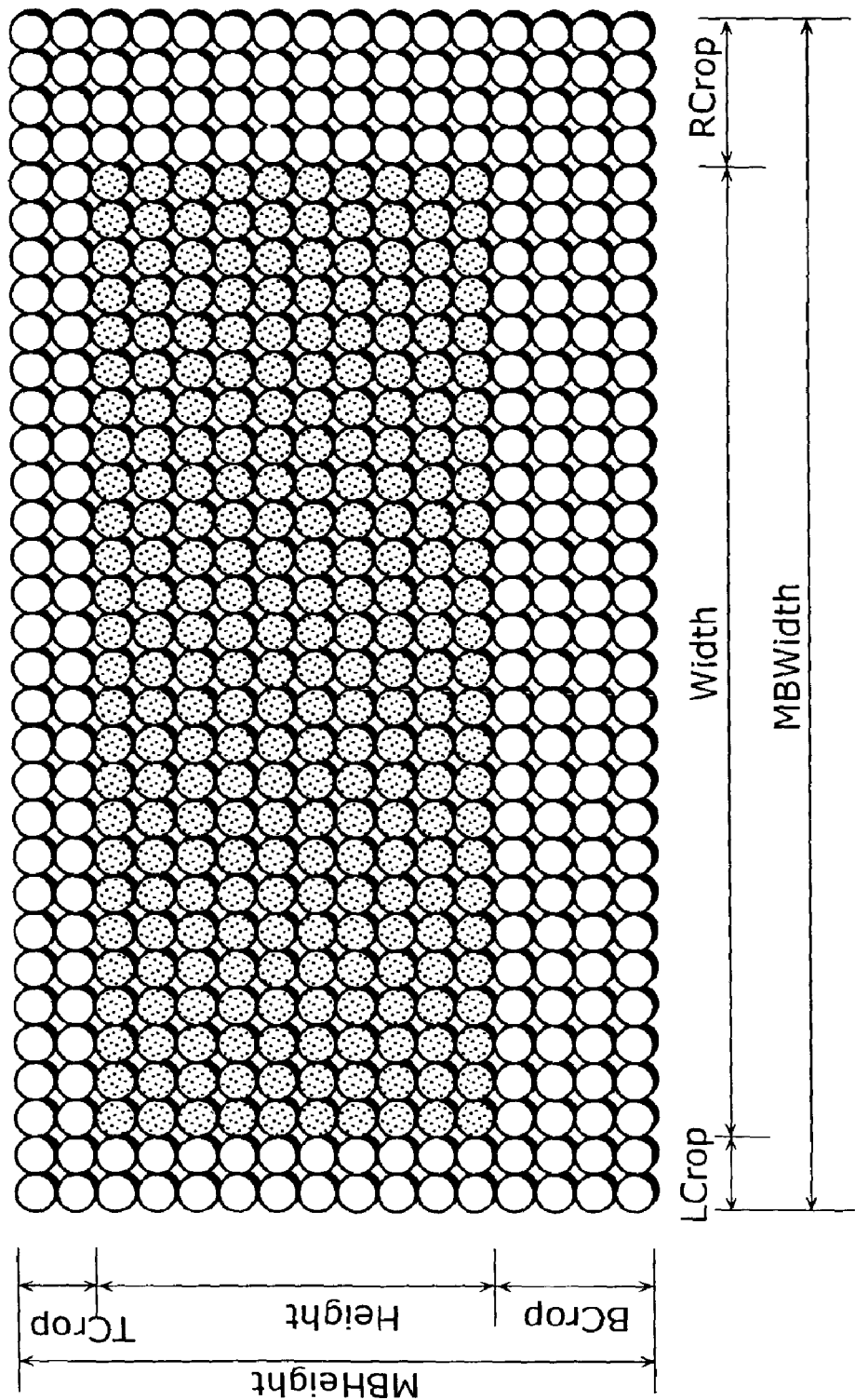
FIG. 1 is a drawing to describe a display area of pictures.
Figure 2B:
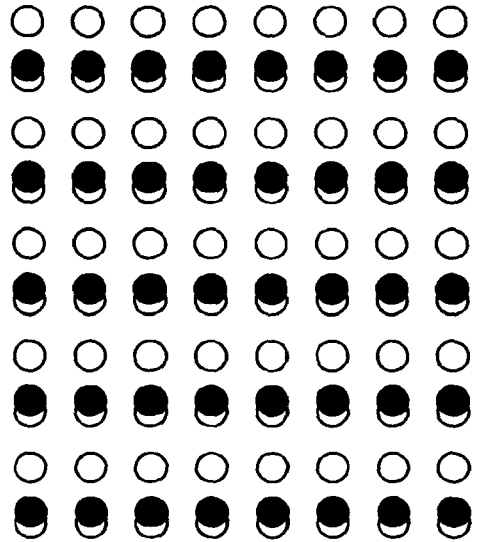
FIG. 2A, FIG. 2B and FIG. 2C are drawings to show a color format of pictures.
Figure 2A:
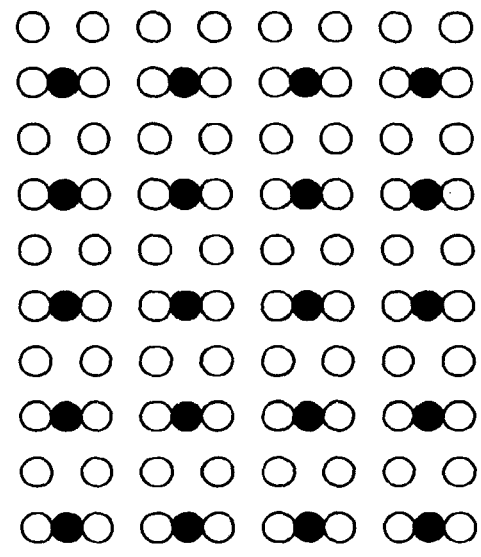
Figure 2C:
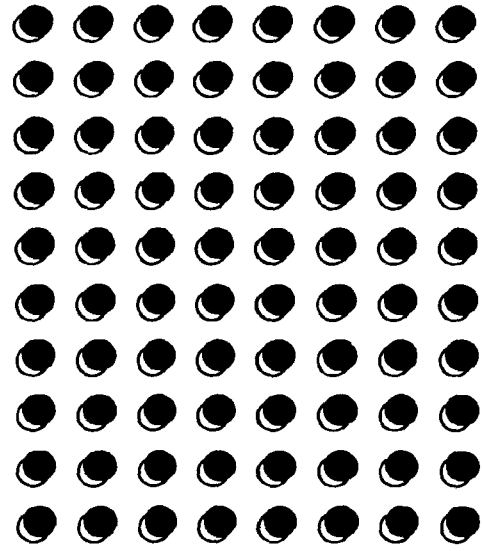
Figure 3:
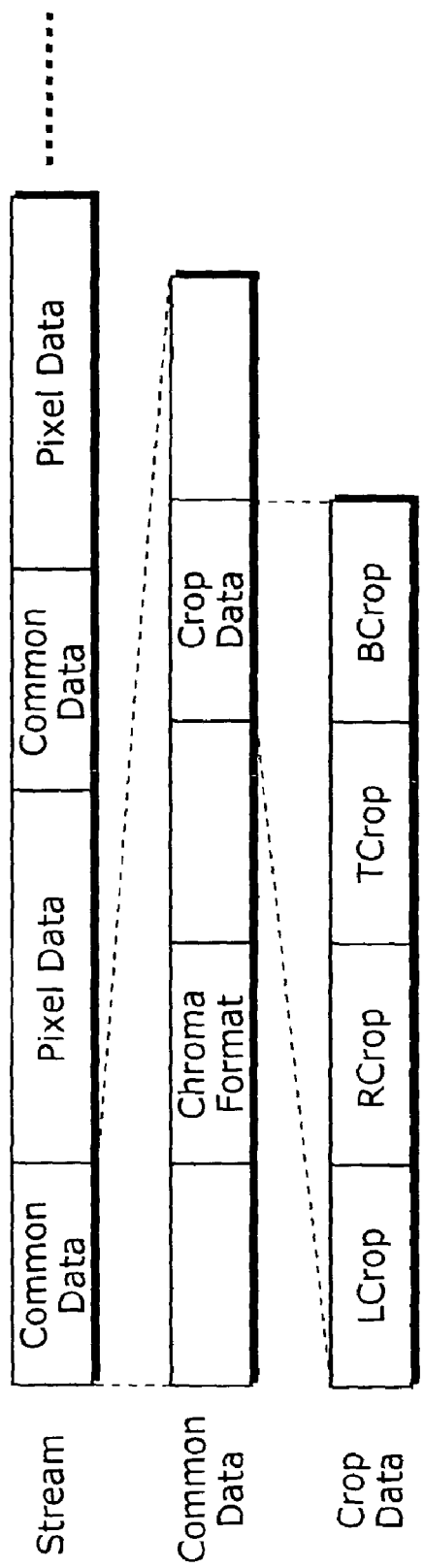
FIG. 3 is a drawing to show a data structure of a bitstream.

Furthermore, the picture size of the whole pixel area to be coded, that is the number of horizontal pixels MBWidth and the number of vertical pixels MBHeight shown in FIG. 1, may be coded similarly together with output area information or substitutively as a data related to the picture size.

Figure 6:
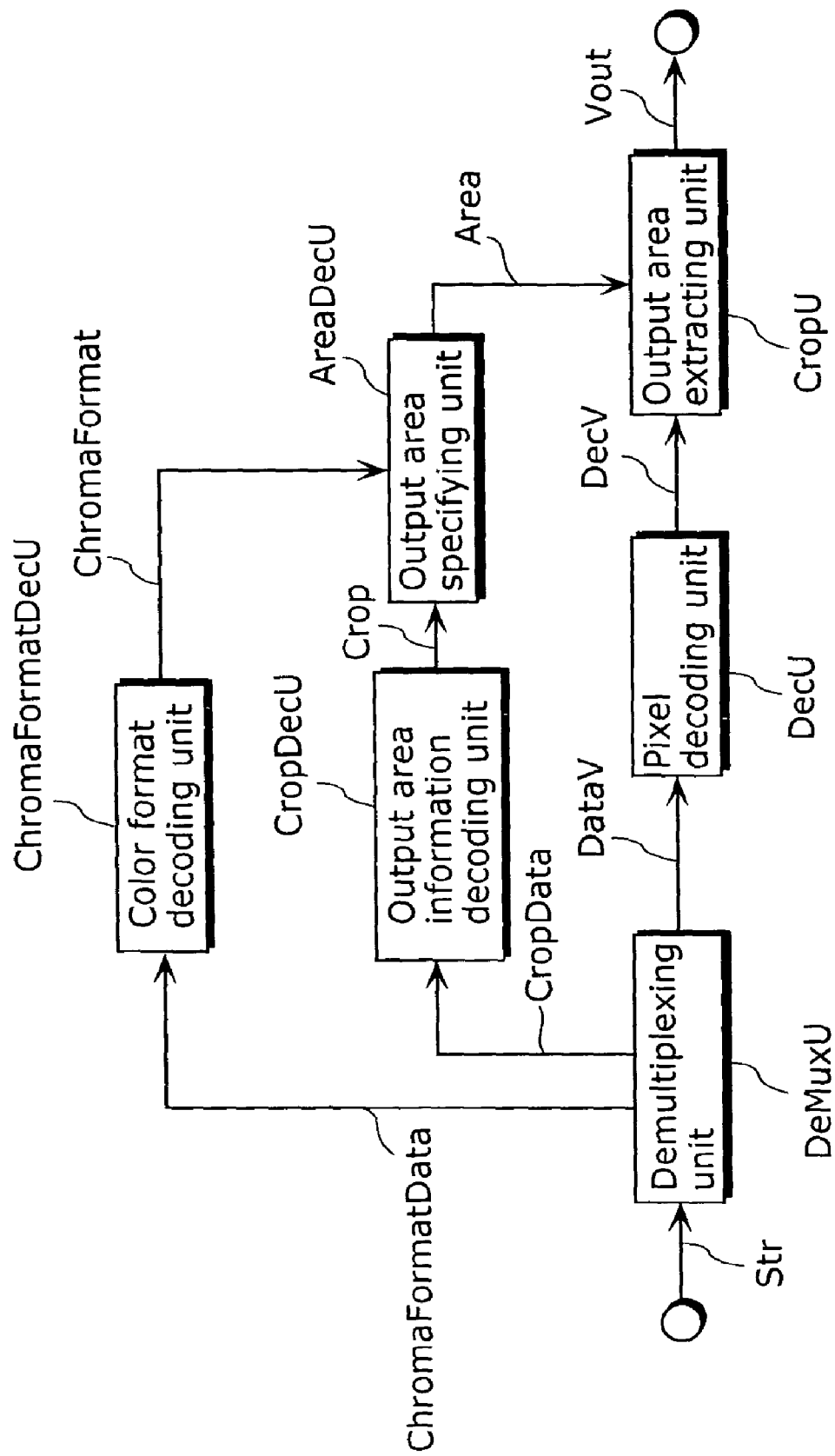
FIG. 6 is a block diagram to show a structure of a picture decoding apparatus of the present invention.

FIG. 6 is a block diagram to show a structure of a picture decoding apparatus of the present invention. The bitstream Str is separated into a color format coding information ChromaFormatData, an output area coding information CropData and a coding picture data DataV in the demultiplexing unit DeMuxU. The coding picture data DataV is decoded using anti-orthogonal transformation, anti-quantization, variable length decoding, motion compensation and so on by pixel decoding unit DecU. The pixels values obtained by the decoding is outputted as decoded picture data DecV. The color format decoding unit ChromaFormatDecU decodes the color format coding information ChromaFormatData by such as the variable length code table in FIG. 4A. And then the decoded color format coding information ChromaFormatData is outputted as color format ChromaFormat. Similarly the output area information decoding unit CropDec U decodes the output area coding information CropData by such as the variable length code table in FIG. 4B. And then the decoded output area coding information CropData is outputted as output area information Crop. The output area specifying unit AreaDecU converts the output area information Crop into the output area Area depending on color format ChromaFormat.

For example, in the case where color format ChromaFormat indicates that the ratio of the number of pixels of luminance to chrominance is M:1 in horizontal direction and N:1 in vertical direction, since the output area information Crop represents LCrop/M, RCrop/M, TCrop/N and BCrop/N, LCrop, RCrop, TCrop and BCrop representing the output area Area can be obtained by multiplying by M or N respectively. The output area extracting unit CropU extracts the area indicated by output area Area out of decoding picture data DecV, and outputs as output picture Vout.

It should be noted that the output area information Crop are indicated by LCrop, RCrop, TCrop and BCrop, and Width and Height may be used as a part of data substitutively. Additionally, in the case where LCrop and Tcrop of the output area are zero, only TCrop and BCrop may be decoded out of output information CropData.

Furthermore, the picture size of the whole pixel area to be coded, that is the number of horizontal pixels MBWidth and the number of vertical pixels MBHeight shown in FIG. 1 may be decoded similarly together with output area information or substitutively as a data related to the picture size.

Figure 7A:
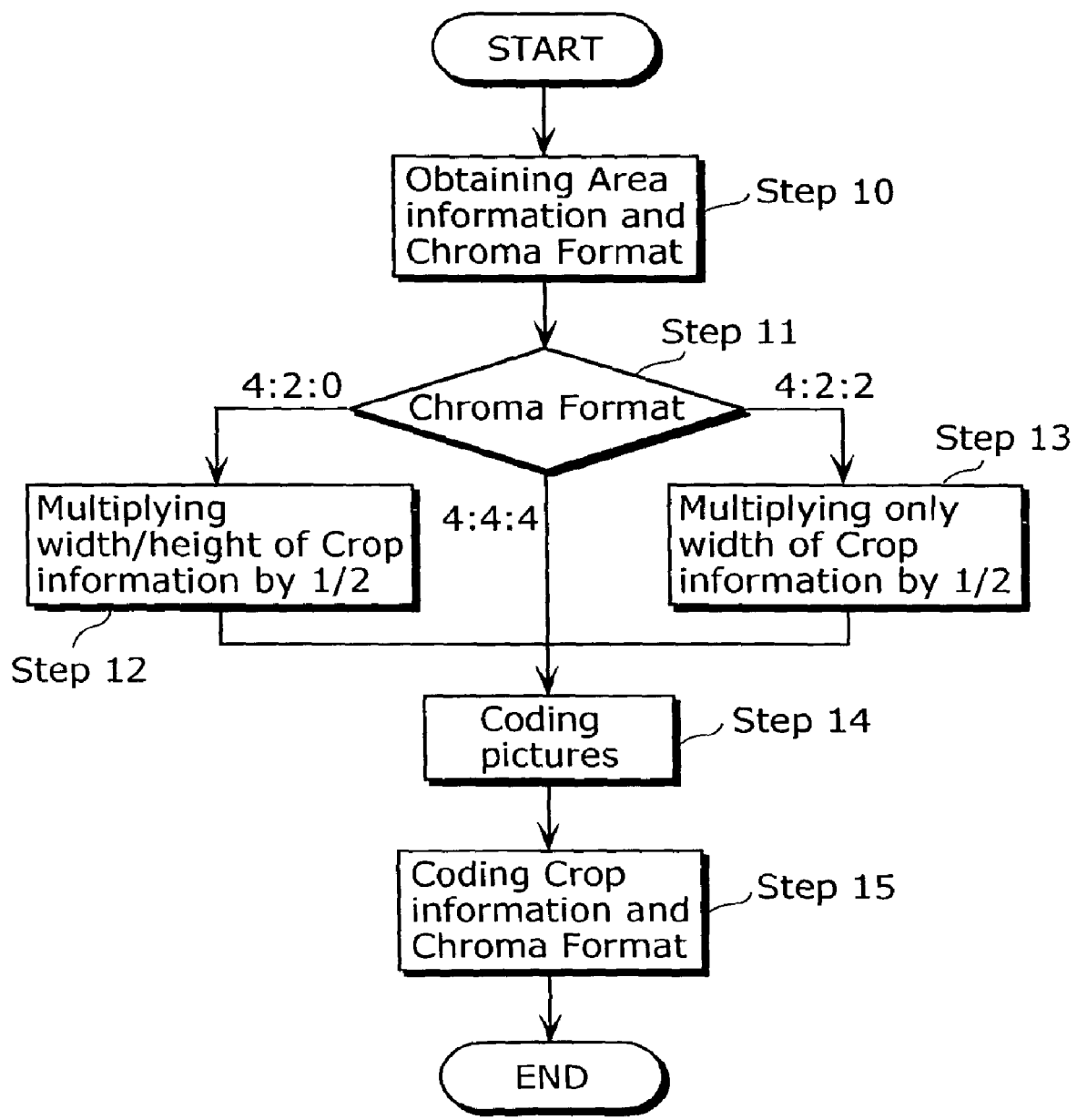
FIG. 7A and FIG. 7B are flowcharts to show picture coding methods of the present invention.

FIG. 7A is a flowchart to show a picture coding method of the present invention and to show a procedure of a picture coding method as shown in a block diagram of the picture coding apparatus of the present invention in FIG. 5.

First the output area Area and the color format ChromatFormat are obtained from outside (Step 10). The derivation process for output area information Crop is changed depending on the color format ChromaFormat, which is either 4:2:0, 4:2:2 or 4:4:4 (Step 11). In the case where color format ChormaFormat is 4:2:0, width (value in horizontal direction) and height (value in vertical direction), which are contained in the output area information, are multiplied by ½ respectively, and the result of the multiplication by ½ is used as output area information Crop (Step 12). In the case where color format ChromaFormat is 4:2:2, only width (value in horizontal direction), which is contained in the output area information, is multiplied by ½, and the result of the multiplication by ½ is used as output area information Crop (Step 13). After an input picture Vin is coded (Step 14), the color format ChromaFormat and output area information Crop are coded (Step 15).

Figure 7B:
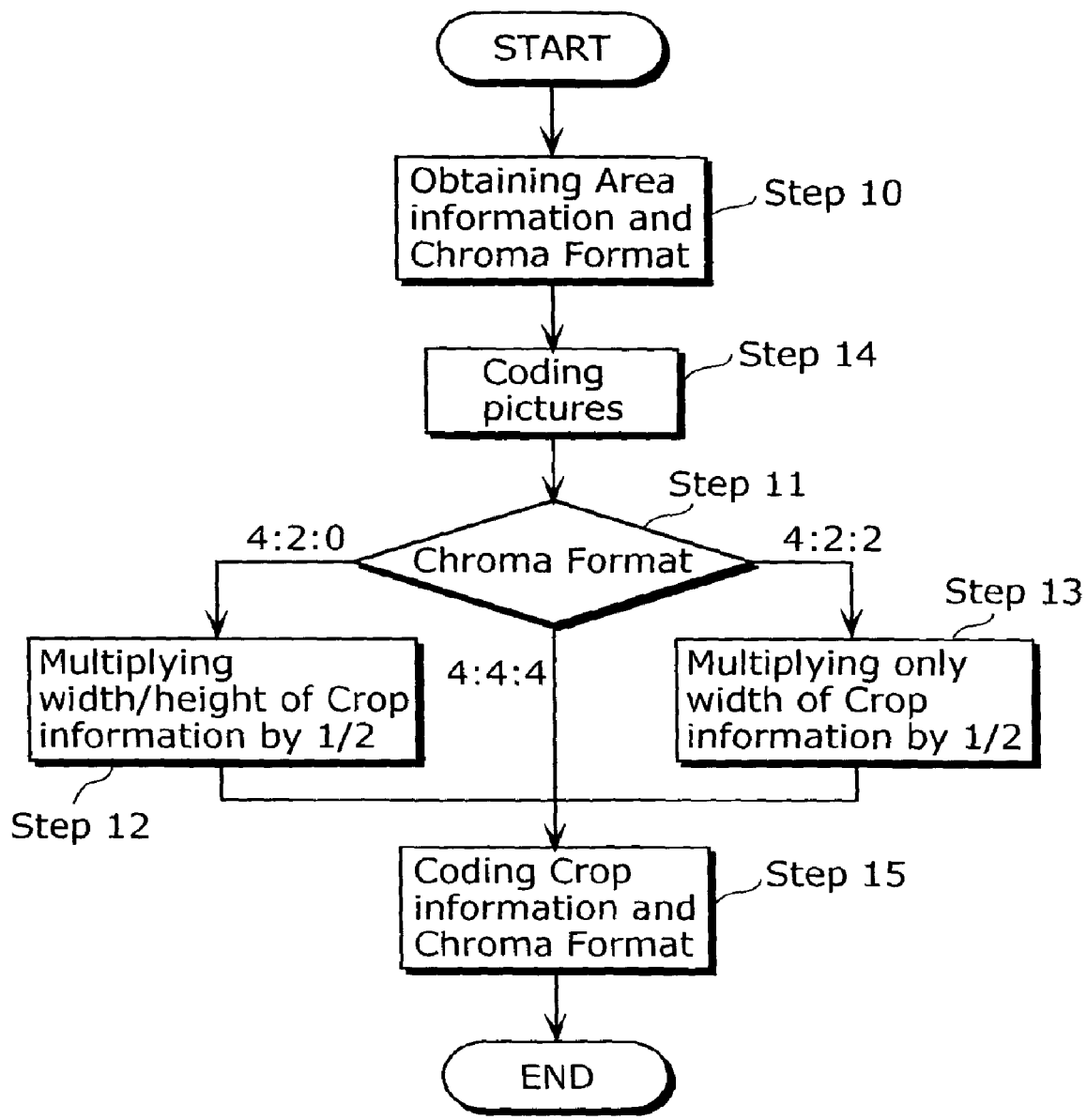

It should be noted that Step 14 may be performed before Steps 10 and 11, and the case that Step 14 is performed before Step 11 is shown in FIG. 7B.

Additionally, the codings of the color format ChromaFormat and the output area information Crop (Step 15) may be executed before the coding of the input picture Vin (Step 14). In that case, Step 14 is executed immediately after Step 15 in the flowcharts of FIG. 7A and FIG. 7B.

Besides, in the embodiment, it is exemplified that the color formats ChromaFormat are 4:2:0, 4:2:2 and 4:4:4 only. However, in the case where the ratio of the number of pixels of luminance to chrominance is M:1 in horizontal direction and N:1 in vertical direction, the width can be multiplied by 1/M instead of ½ and the height can be multiplied by 1/N instead of ½ for functioning practically.

Furthermore, the picture size of the whole pixel area to be coded, that is the number of horizontal pixels MBWidth and the number of vertical pixels MBHeight shown in FIG. 1, may be coded similarly together with output area information or substitutively as a data related to the picture size.

Figure 8A:
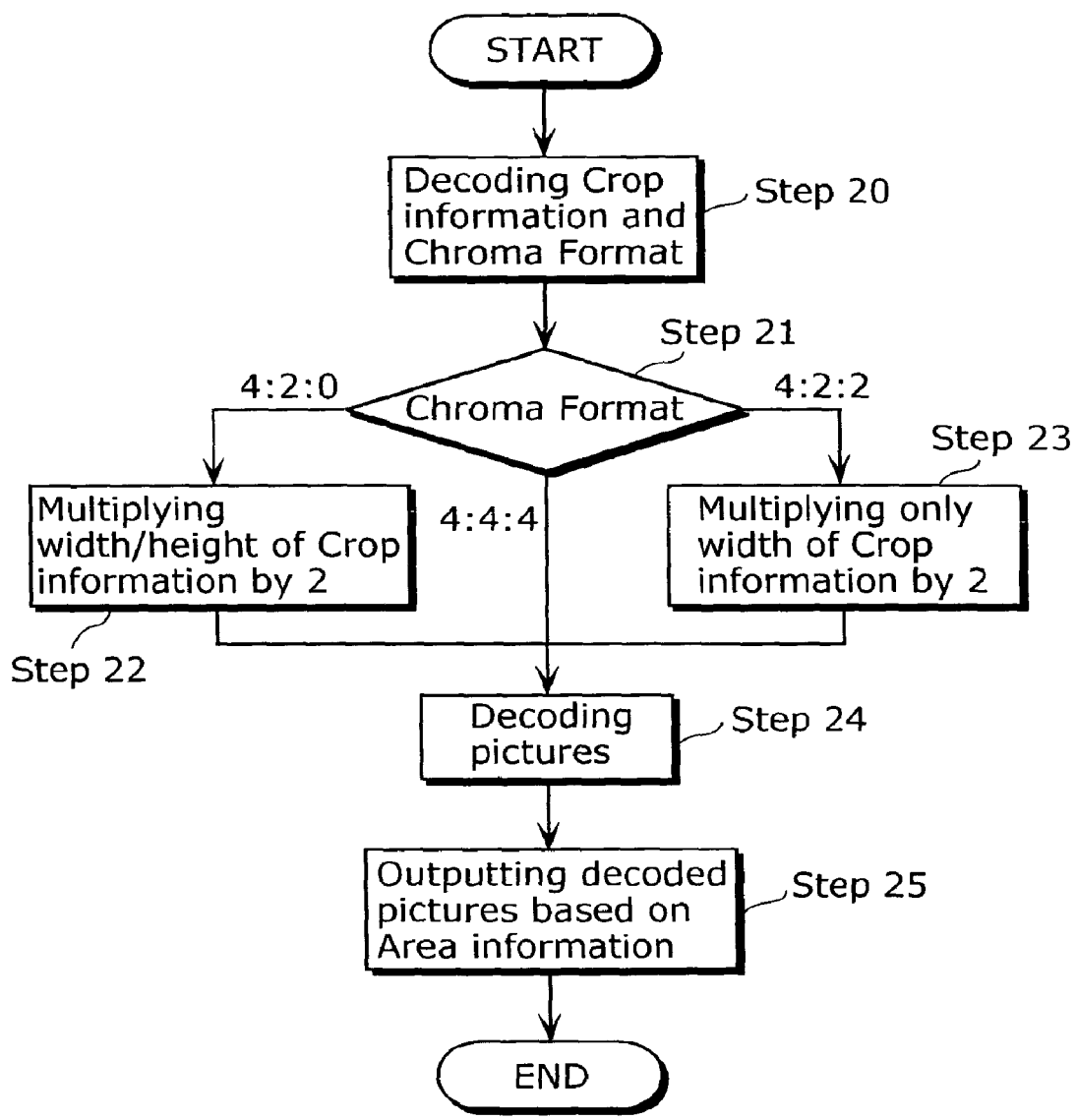

FIG. 8A is a flowchart to show a picture decoding method of the present invention and is showing the procedure of the picture decoding method as shown in the block diagram of the picture decoding method in FIG. 6.

First the output area information Crop and the color format ChromaFormat are decoded (Step 20). The decoding process of the output area information Crop is changed depending on the color format ChromaFormat, which is either 4:2:0, 4:2:2 or 4:4:4 (Step 21). In the case where color format ChromaFormat is 4:2:0, width (value in horizontal direction) and height (value in vertical direction), which are contained in the output area information indicated in output area information Crop, are multiplied by 2 respectively, and the result of the multiplication by 2 is used as output area Area (Step 22). In the case where the color format ChromaFormat is 4:2:2, only width (value in horizontal direction), which is contained in output area information indicated in output area information Crop, is multiplied by 2, and the result of the multiplication by 2 is used as output area Area (Step 23). After the picture signal is decoded out of the bitstream Str (Step 24), a part of the decoded picture is extracted depending on the output area Area, and outputted as an output picture Vout (Step 25).

It should be noted that Step 24 may be performed before Steps 20 and 21, and the case that Step 24 is performed before Step 21 is shown in FIG. 8B.

Besides, in the embodiment, it is exemplified that the color formats ChromaFormat are 4:2:0, 4:2:2 and 4:4:4 only. However, in the case where the ratio of the number of pixels of luminance to chrominance is M:1 in horizontal direction and N:1 in vertical direction, the width can be multiplied by M instead of 2 and the height can be multiplied by N instead of 2 for functioning practically.

Furthermore, the picture size of the whole pixel area to be coded, that is the number of horizontal pixels MBWidth and the number of vertical pixels MBHeight shown in FIG. 1 may be decoded similarly together with output area information or substitutively as a data related to the picture size.

Moreover, if a program for realizing the picture coding method and the picture decoding method mentioned above are recorded on a recording medium such as a flexible disk, it is possible to easily perform the processing presented above in an independent computer system.

Figure 9A:
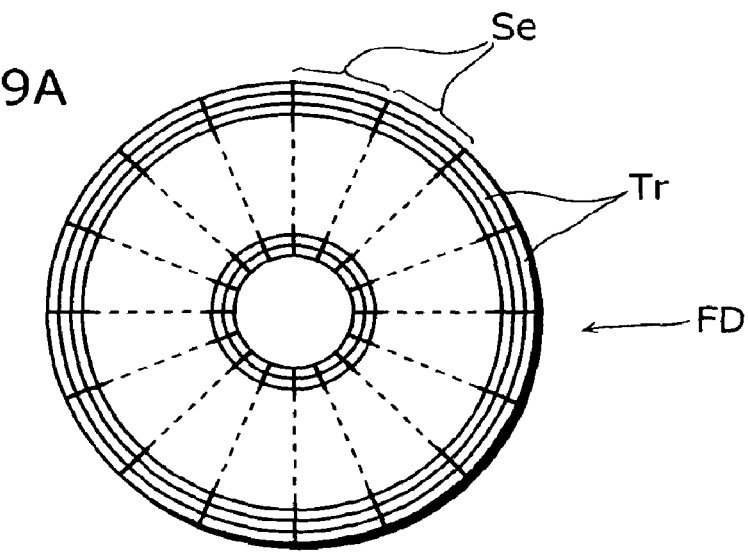
FIG. 9A, FIG. 9B and FIG. 9C are drawings to show recording media such as flexible disc.
Figure 9B:
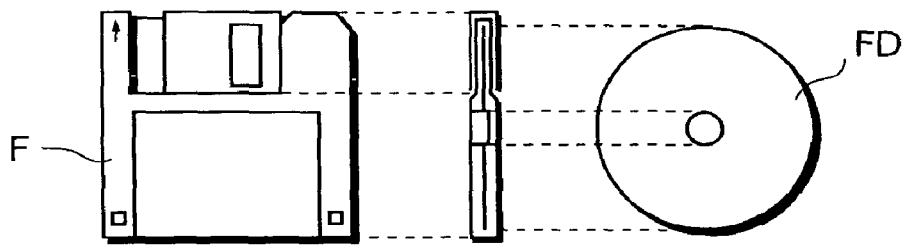
Figure 9C:
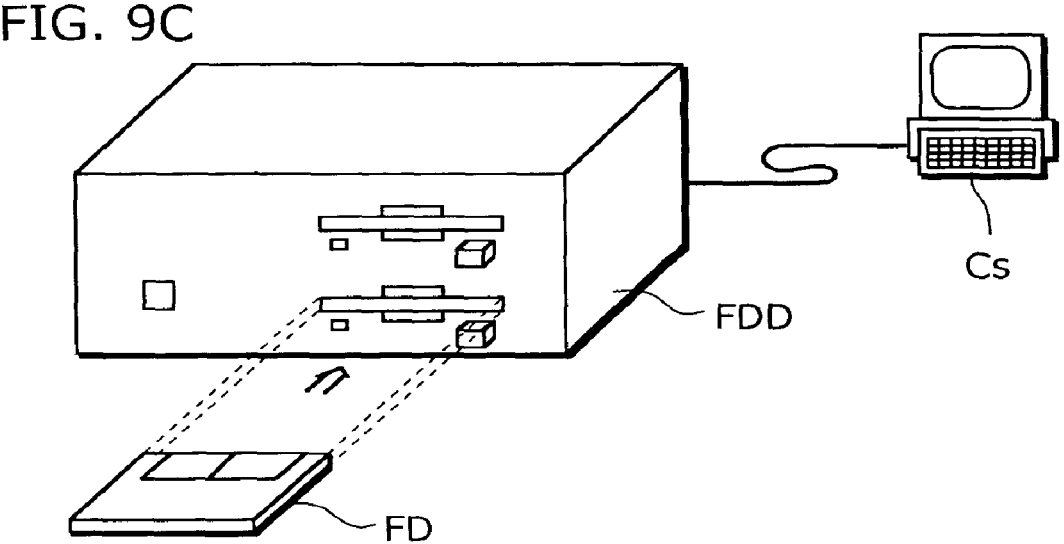

FIG. 9A, FIG. 9B and FIG. 9C are diagrams illustrating a recording medium that stores a program for realizing the picture coding method and the picture decoding method according to the above-mentioned embodiment.

FIG. 9B shows a front view of an appearance, a section structure for a flexible disc and a flexible disc, FIG. 9A shows an example of a physical format of flexible disc as a recording medium. The flexible disk FD is contained in a case F, and plural of tracks Tr are formed concentrically on the surface of the flexible disk FD from periphery toward inner periphery, each track being divided into 16 sectors Se in the angular direction. Therefore, in the flexible disk storing the above-mentioned program, the picture coding method and the picture decoding method as such programs are recorded in an area allocated for it on the flexible disk FD.

Further, FIG. 9C shows a structure for recording and replaying of above said programs into a flexible disc FD. When the above programs to realize the picture coding method and the picture decoding method are to be recorded on the flexible disk FD, such programs shall be written using computer system Cs via a flexible disk drive FDD. Meanwhile, when the picture coding method and the picture decoding method, which realize the picture coding method and the picture decoding method by the programs in flexible disc FD, are to be constructed in the computer system, the program shall be read out from flexible disk FD via the flexible disk drive FDD and then transferred to computer system Cs.

It should be noted that a flexible disc is exemplified as a recoding medium in the above-mentioned description, but an optical disc also can be used likewise. Further recording media are not limited to above examples, but any program recordable media such as an IC card, a ROM cassette and so on can be practical.

The following describes application examples of the picture coding method and the picture decoding method as shown above as well as a system employing them.

Figure 10:
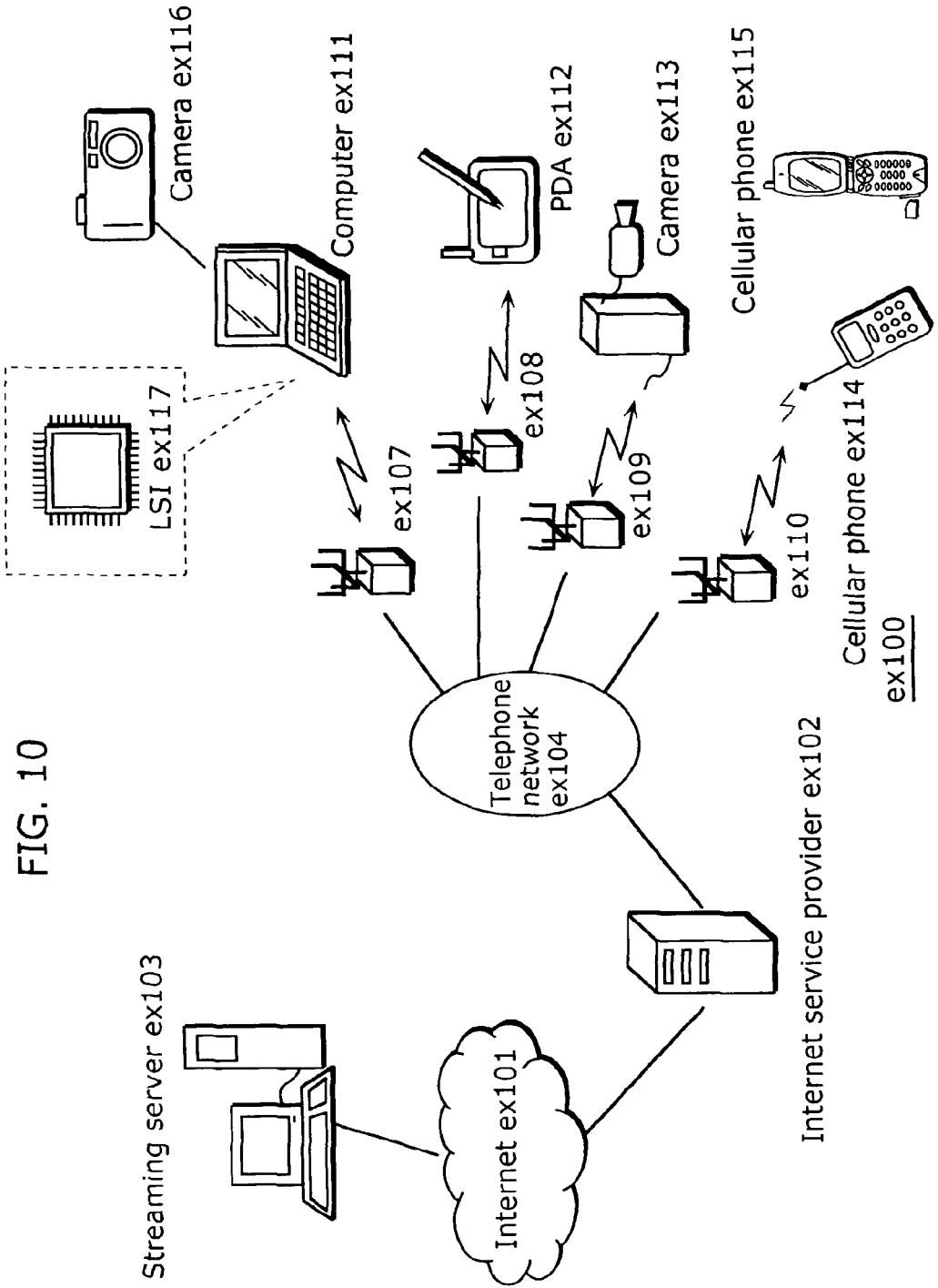
FIG. 10 shows a block diagram to show a whole structure of a content providing system.

FIG. 10 shows a whole structure of a content providing system ex100 that realizes a content providing service. The area for providing a communication service is divided into cells of desired size, and base stations ex107 to ex110, which are fixed wireless stations, are placed in the respective cells.

In this content providing system ex100, devices such as a computer ex111, a PDA (Personal Digital Assistant) ex112, a camera ex113, a cellular phone ex114, and a camera-equipped cellular phone ex115 are respectively connected to Internet ex101 via an Internet service provider ex102, a telephone network ex104, and base stations ex107~ex110.

However, content providing system ex100 is not limited to the combination as shown in FIG. 10, and may be connected to a combination of any of them. Also, each of the devices may be connected directly to telephone network ex104, not via base stations ex107 to ex110, which are fixed wireless stations. Camera ex113 is a device such as a digital video camera capable of taking moving pictures. The cellular phone may be a cellular phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone system) or the like, and may be any one of these.

Furthermore, a streaming server ex103 is connected to camera ex113 via base station ex109 and telephone network ex104, which enables live distribution or the like based on coded data transmitted by a user using camera ex113. Either camera ex113 or a server and the like capable of data transmission processing may code the data taken. Also, moving picture data taken by a camera ex116 may be transmitted to streaming server ex103 via computer ex111. Camera ex116 is a device such as a digital camera capable of taking still pictures and moving pictures. In this case, either camera ex116 or computer ex111 may code the moving picture data. In this case, an LSI ex117 included in computer ex111 or camera ex116 performs coding processing. Note that software for coding and decoding may be integrated into a certain type of storage medium (such as a CD-ROM, a flexible disk and a hard disk) that is a recording medium readable by computer ex111 and the like. Furthermore, camera-equipped cellular phone ex115 may transmit a moving picture data. This moving picture data is data coded by an LSI included in cellular phone ex115.

In this content providing system ex100, content (e.g. a music live video) which has been taken by a user using camera ex113, camera ex116 or the like is coded in the same manner as the above embodiment and transmitted to streaming server ex103, while streaming server ex103 distributes the content data to subscribers upon request. The subscribers here include computer ex111, PDA ex112, camera ex113, cellular phone ex114 and so on capable of decoding the above coded data. Content providing system ex100 with the above configuration is a system that enables the subscribers to receive and reproduce the coded data and realizes personal broadcasting by allowing them to receive, decode and reproduce the data in real time.

The picture coding apparatus and the picture decoding apparatus presented in the above embodiment can be used for coding and decoding to be performed in each of the device constructing the above system.

An example for a cellular phone is described hereinafter.

Figure 11:
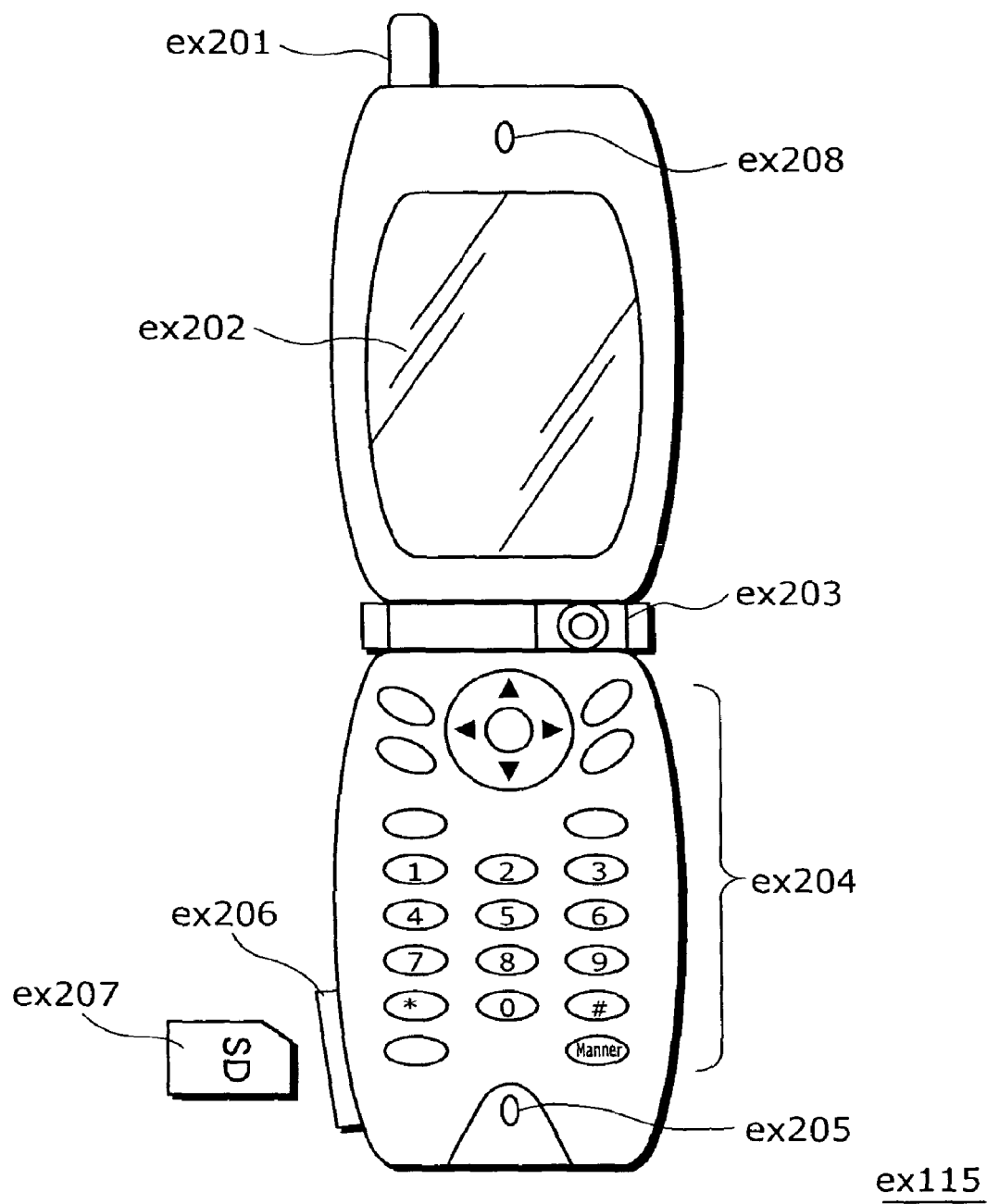
FIG. 11 shows an appearance of a cellular phone.

FIG. 11 is a diagram showing cellular phone ex115 that employs the picture coding method and the picture decoding method described in the above embodiment. Cellular phone ex115 has an antenna ex201 for transmitting/receiving radio waves to and from base station ex110, a camera unit ex203 such as a CCD camera capable of taking video and still pictures, a display unit ex202 such as a liquid crystal display for displaying the decoded data, that are a video taken by camera unit ex203 and a video received through antenna ex201 and the like, a main unit equipped with a group of operation keys ex204, a voice output unit ex208 such as a speaker for outputting voices, a voice input unit ex205 such as a microphone for inputting voices, a recording medium ex207 for storing coded data or decoded data such as data of moving pictures or still pictures taken by the camera, data of received e-mails and moving picture data or still picture data, and a slot unit ex206 for enabling recording medium ex207 to be attached to cellular phone ex115. Recording medium ex207 is embodied as a flash memory element, a kind of EEPROM (Electrically Erasable and Programmable Read Only Memory) that is an electrically erasable and rewritable non-volatile memory, stored in a plastic case such as an SD card.

Figure 12:
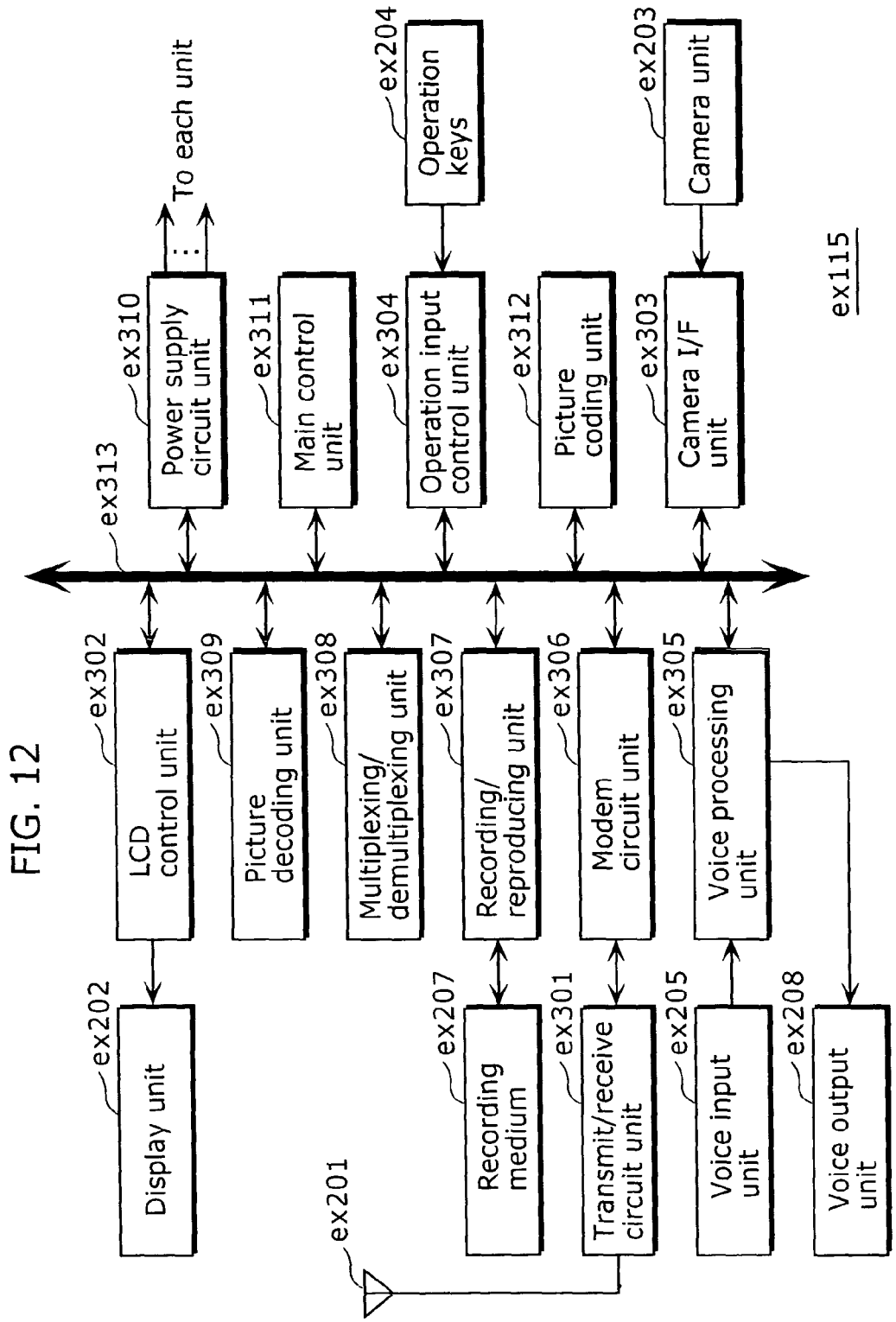
FIG. 12 is a block diagram to show a structure of a cellular phone.

Next, referring to FIG. 12, a description of cellular phone ex115 is given. In cellular phone ex115, a main control unit ex311 for centrally controlling display unit ex202 and each unit of the main unit having the operation keys ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a recording/reproducing unit ex307, a modem circuit unit ex306 and a voice processing unit ex305 are interconnected via a synchronous bus ex313.

When a call-end key or a power key is turned on by a user operation, power supply circuit unit ex310 supplies each unit with power from a battery pack, and activates camera-equipped digital cellular phone ex115 to make it into a ready state.

In the cellular phone ex115, voice processing unit ex305 converts a voice signal received by the voice input unit ex205 in conversation mode into digital voice data under the control of main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transformation processing on the data, so as to transmit the resultant via antenna ex201. Also, in cellular phone ex115, data received by antenna ex201 in conversation mode is amplified and performed of frequency transformation processing and analog-to-digital conversion processing, modem circuit unit ex306 performs inverse spread spectrum processing on the resultant, and voice processing unit ex305 converts it into analog voice data, so as to output it via voice output unit ex208.

Furthermore, when sending an e-mail in data communication mode, text data of the e-mail inputted by operating operation keys ex204 on the main unit is sent out to main control unit ex311 via operation input control unit ex304. In main control unit ex311, after modem circuit unit ex306 performs spread spectrum processing on the text data and transmit/receive circuit unit ex301 performs digital-to-analog conversion processing and frequency transformation processing on it, the resultant is transmitted to base station ex110 via antenna ex201.

When picture data is transmitted in data communication mode, the picture data taken by camera unit ex203 is supplied to picture coding unit ex312 via camera interface unit ex303. When picture data is not to be transmitted, it is also possible to display such picture data taken by camera unit ex203 directly on display unit ex202 via camera interface unit ex303 and LCD control unit ex302.

Picture coding unit ex312, which includes the picture coding apparatus according to the present invention, performs compression coding on the picture data supplied from camera unit ex203 using the coding method employed by the picture coding apparatus presented in the above embodiment, so as to convert it into coded picture data, and sends it out to multiplexing/demultiplexing unit ex308. At this time, cellular phone ex115 sends voices received by voice input unit ex205 during the shooting by camera unit ex203, to multiplexing/demultiplexing unit ex308 as digital voice data via voice processing unit ex305.

Multiplexing/demultiplexing unit ex308 multiplexes the coded picture data supplied from picture coding unit ex312 and the voice data supplied from voice processing unit ex305 using a predetermined method, modem circuit unit ex306 performs spread spectrum processing on the resulting multiplexed data, and the transmit/receive circuit unit ex301 performs digital-to-analog conversion processing and frequency transformation processing on the resultant, so as to transmit the processed data via the antenna ex201.

When receiving, in data communication mode, moving picture file data which is linked to a Web page or the like, modem circuit unit ex306 performs inverse spread spectrum processing on the received signal received from base station ex110 via antenna ex201, and sends out the resulting multiplexed data to multiplexing/demultiplexing unit ex308.

In order to decode the multiplexed data received via antenna ex201, multiplexing/demultiplexing unit ex308 separates the multiplexed data into a coded bitstream of picture data and a coded bitstream of voice data, and supplies such coded picture data to picture decoding unit ex309 and such voice data to voice processing unit ex305 via synchronous bus ex313.

Next, picture decoding unit ex309, which includes the picture decoding apparatus according to the present invention, decodes the coded bitstream of the picture data using the decoding method paired with the coding method shown in the above-mentioned embodiment so as to generate moving picture data for reproduction, and supplies such data to display unit ex202 via LCD control unit ex302. Accordingly, moving picture data included in the moving picture file linked to a Web page, for instance, is displayed. At the same time, voice processing unit ex305 converts the voice data into an analog voice signal, and then supplies this to voice output unit ex208. Accordingly, voice data included in the moving picture file linked to a Web page, for instance, is reproduced.

Figure 13:
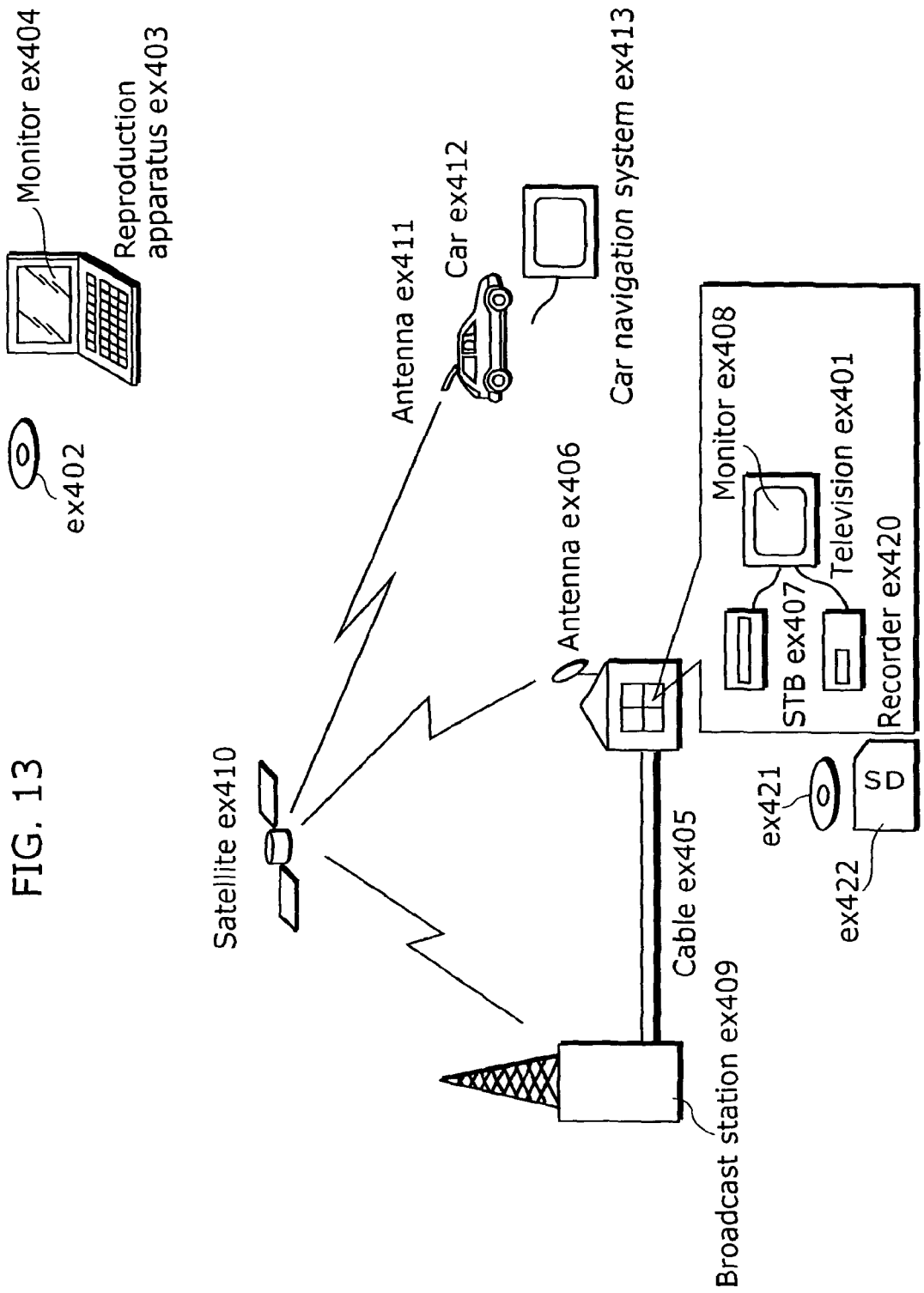
FIG. 13 shows an example of a digital broadcasting system.

Note that the abovementioned system is not an exclusive example and therefore that at least either the picture coding apparatus or the picture decoding apparatus of the above embodiment can be incorporated into a digital broadcasting system as shown in FIG. 13, in a circumstance that satellite/terrestrial digital broadcasting has been a recent topic of conversation. To be more specific, at a broadcasting station ex409, a coded bitstream of video information is transmitted, by radio waves, to a satellite ex410 for communications or broadcasting. Upon receipt of it, broadcast satellite ex410 transmits radio waves for broadcasting, an antenna ex406 of a house equipped with satellite broadcasting reception facilities receives such radio waves, and an apparatus such as a television (receiver) ex401 and a set top box (STP) ex407 decodes the coded bitstream and reproduces the decoded data. The picture decoding apparatus as shown in the abovementioned embodiment can be performed in reproduction apparatus ex403 for reading and decoding the coded bitstream recorded on a storage medium ex402 that is a recording medium such as a CD and a DVD. In this case, a reproduced video signal is displayed on a monitor ex404. It is also conceivable that the picture decoding apparatus is performed in the set top box ex407 connected to a cable ex405 for cable television or the antenna ex406 for satellite/terrestrial broadcasting so as to reproduce it on a television monitor ex408. In this case, the picture decoding apparatus may be incorporated into the television, not in the set top box. Or, a car ex412 with an antenna ex411 can receive a signal from satellite ex410, base station ex107 or the like, so as to reproduce a moving picture on a display device such as a car navigation system ex413 mounted on car ex412.

Furthermore, it is also possible to code a picture signal by the picture coding apparatus presented in the above embodiment and to record the resultant on a recording medium. Examples include a DVD recorder for recording a picture signal on a DVD disc ex421 and a recorder ex420 such as a disc recorder for recording a picture signal on a hard disk. Moreover, a picture signal can also be recorded in an SD card ex422. If the recorder ex420 is equipped with the picture decoding apparatus presented in the above embodiment, it is possible to reproduce a picture signal recorded on DVD disc ex421 or in SD card ex422, and display it on monitor ex408.

As the configuration of the car navigation system ex413, the configuration without camera unit ex203 and the camera interface unit ex303, out of the configuration shown in FIG. 12, is conceivable. The same is applicable to computer ex111, television (receiver) ex401 and the like.

Concerning the terminals such as cellular phone ex114, a transmitting/receiving terminal having both a coder and a decoder, as well as a transmitting terminal only with a coder, and a receiving terminal only with a decoder are the three possible forms substantially.

As stated above, it is possible to employ the picture coding method and the picture decoding method presented in the above embodiment into any one of the above-mentioned devices and systems. Accordingly, it becomes possible to achieve an effect described in the abovementioned embodiment.

As mentioned hereinbefore, it is possible to code the output area coding information CropData with less number of bits without deteriorating accuracy of output pixel to be presented, and the practical value is high.

Note that each function block in the block diagram shown in FIG. 5 and FIG. 6 can be realized as an LSI that is an integrated circuit apparatus typically. Such LSI may be incorporated in one or plural chips e.g., function blocks other than a memory may be incorporated into a single chip. Here, LSI is exemplified, however, it may be called as "IC", "system LSI", "super LSI" and "ultra LSI" depending on the integration degree.

The method for incorporation into an integrated circuit is not limited to the LSI, and it may be realized with an exclusive line or a general processor. After manufacturing of LSI, a Field Programmable Gate Array (FPGA) that is programmable, or a reconfigurable processor that can reconfigure the connection and settings for the circuit cell in the LSI, may be utilized.

Furthermore, along with the arrival of technique for incorporation into an integrated circuit, which replaces the LSI owing to a progress in semiconductor technology or another extended technique, integration of the function blocks may be carried out using the newly-arrived technology. Application of bio-technology may be cited as one of the examples.

And also in each function block, a unit to store data may be structured individually as an record medium in the embodiment and not necessary to be a chip.

In each function block of block diagrams shown in FIG. 5 and FIG. 6, and the flowcharts shown in FIG. 7A, FIG. 7B, FIG. 8A and FIG. 8B, the essential part is realized by a micro processor and a program, the present invention, therefore, may be constructed as a program.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The invention claimed is:

1. A picture coding method comprising:
coding, using a processor, a picture signal;
coding a ratio of a number of luminance pixels to a number of chrominance pixels for the picture signal;
selecting one coding method out of at least two coding methods, the one coding method being selected based on the ratio; and
coding data related to a picture size in accordance with the selected coding method,
wherein the data related to the picture size indicates a size of a picture corresponding to the picture signal,
wherein, when a ratio of a number of horizontal luminance pixels to a number of horizontal chrominance pixels is M:1, said selecting selects a coding method coding 1/M of a number of horizontal pixels, the horizontal luminance pixels and the horizontal chrominance pixels being included in the picture signal, and
wherein the data related to the picture size indicates an output area in a whole pixel area coded in said coding of the picture signal, the output area being a pixel area to be outputted in decoding.

2. A picture coding apparatus comprising:
a picture coding unit including a processor operable to code a picture signal;
a ratio coding unit operable to code a ratio of a number of luminance pixels to a number of chrominance pixels for the picture signal;
a selecting unit operable to select one coding method out of at least two coding methods, the one coding method being selected based on the ratio; and
a data coding unit operable to code data related to a picture size in accordance with the selected coding method,
wherein the data related to the picture size indicates a size of a picture corresponding to the picture signal,
wherein, when a ratio of a number of horizontal luminance pixels to a number of horizontal chrominance pixels is M:1, said selecting unit selects a coding method coding 1/M of a number of horizontal pixels, the horizontal luminance pixels and the horizontal chrominance pixels being included in the picture signal, and
wherein the data related to the picture size indicates an output area in a whole pixel area coded by said picture coding unit, the output area being a pixel area to be outputted in decoding.

3. A non-transitory computer-readable recording medium having a picture coding program recorded thereon, the picture coding program causing a computer to execute a method comprising:
coding, using a processor, a picture signal;
coding a ratio of a number of luminance pixels to a number of chrominance pixels for the picture signal;
selecting one coding method out of at least two coding methods, the one coding method being selected based on the ratio; and
coding data related to a picture size in accordance with the selected coding method,
wherein the data related to the picture size indicates a size of a picture corresponding to the picture signal,
wherein, when a ratio of a number of horizontal luminance pixels to a number of horizontal chrominance pixels is M:1, said selecting selects a coding method coding 1/M of a number of horizontal pixels, the horizontal luminance pixels and the horizontal chrominance pixels being included in the picture signal, and
wherein the data related to the picture size indicates an output area in a whole pixel area coded in said coding of the picture signal, the output area being a pixel area to be outputted in decoding.

* * * * *